United States Patent
Liao et al.

(10) Patent No.: US 7,009,518 B2
(45) Date of Patent: Mar. 7, 2006

(54) RFID COMMUNICATION SYSTEM AND THE SEARCH METHOD THEREOF

(75) Inventors: Tung-Tsai Liao, Hsinchu (TW); Hsin-Chou Lee, Hsinchu (TW); Wu-Shin Chen, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 94 days.

(21) Appl. No.: 10/832,386

(22) Filed: Apr. 27, 2004

(65) Prior Publication Data

US 2004/0257204 A1 Dec. 23, 2004

(30) Foreign Application Priority Data

Jun. 20, 2003 (TW) ................................ 92116806 A

(51) Int. Cl.
*G08B 13/14* (2006.01)

(52) U.S. Cl. ................. 340/572.1; 340/10.1; 340/10.2; 340/10.21; 340/10.33; 370/254; 370/256; 370/346; 455/41; 455/70; 455/88

(58) Field of Classification Search ............. 340/572.1, 340/10.2, 10.1, 10.21, 10.33; 370/254, 256, 370/346; 455/41, 70, 88
See application file for complete search history.

(56) References Cited

U.S. PATENT DOCUMENTS 5,751,570 A * 5/1998 Stobbe et al. ................. 700/11
6,538,563 B1 * 3/2003 Heng ........................ 340/10.2

* cited by examiner

*Primary Examiner*—Daniel Wu
*Assistant Examiner*—Tai T. Nguyen
(74) *Attorney, Agent, or Firm*—Bacon & Thomas, PLLC

(57) ABSTRACT

A radio frequency identification (RFID) communication system and the search method thereof are disclosed, which apply search instructions and reads instructions to communicate between a read and a plurality of transponders. Each transponder generates a random number for comparison with received search instructions. When the random number meets with the number of received search instructions, a response request is sent by a corresponding transponder such that the reader can read the content of the corresponding transponder.

14 Claims, 7 Drawing Sheets

RFID COMMUNICATION SYSTEM AND THE SEARCH METHOD THEREOF

BACKGROUND OF THE INVENTION

1. Field of the Invention

The present invention relates to a radio frequency identification (RFID) communication system and, more particularly, to a radio frequency identification (RFID) communication system and the search method thereof.

2. Description of Related Art

FIG. 1 is a schematic diagram of essential devices of a typical RFID communication system. In FIG. 1, the system includes a reader 11 and a transponder 12. As shown in FIG. 1, the operation principle for the system is that the reader 11 sends a carrier with instructions to the transponder 12 and the transponder 12 obtains DC power via rectifying the carrier. Further, a demodulator inside the transponder demodulates instructions on the carrier, thereby responding the reader or sending required data according to the instructions demodulated.

RFID communication system is increasing quickly and its applications become more diversified, thus typical one-to-one communication cannot meet existing applications. For example, a reader may communicate with a plurality of transponder. FIG. 2 is a schematic diagram of one reader 21 to multiple transponders 22–25. When the transponders 22–25 concurrently send responds to the reader 21, signal interfere among the transponders can cause collision.

Currently, three solutions are applied to prevent collisions, which, as shown in FIG. 2, are spatial domain, frequency domain and time domain. For spatial domain, it is assumed that the transponders 22–25 are separated by a space from each other. Such a solution is applied mostly to microwave systems and can discriminate each object by means of directional antenna. However, such a solution is hard in design for a non-microwave system. For frequency domain, the reader 21 sends a carrier and instructions to the transponder 22–25 at fixed frequency points (band) and the transponders 22–25 respectively selects, according to instructions decoded, one from corresponding multiple back-transmittable frequencies in order to send corresponding ID codes to the reader 21. Since the transponders 22–25 send the ID codes back to the reader 21 in different frequencies, the collision is avoided. However, such a solution costs very high and is limited in specific applications. For time domain, the transponders 22–25 are scheduled such that each of the transponders 22–25 can send its own data in the scheduled time.

One more typical collision solution mostly seen is using polling for searching. Namely, one-to-one roll call is applied for searching. However, such a solution has a poor performance when the number of transponders is large. Accordingly, current collision solution generally adopts binary search algorithm in time domain to thus quickly obtain ID codes of all transponders, or random number method, i.e., using the transponders to generate random numbers to accordingly determine each transponder's transmission time. Since each of the transponders generates different random numbers and thus has different response time, signal interfere probability among the transponders is relatively reduced when random space is much greater than transponder number, such that ID codes of the transponders in read range can be read. Generally, upon read efficiency increase in the random number method, a number of read instructions are increased. For example, a mute instruction is applied to make transponders accurately read corresponding ID codes enter in a mute mode, thereby reducing transponder number facing a reader.

Operation principles respectively for the cited binary search algorithm and the random number method are described as follows. The binary search algorithm is shown in FIGS. 3 and 4. FIG. 3 is a schematic diagram of the binary search algorithm. FIG. 4 is a flowchart of communication between a read 41 and a transponder 42. As shown in FIGS. 3 and 4, for searching ID codes of 0000 and 0011 in a given example of four bits, a search is performed sequentially from MSB to LSB and a collision occurs at third bits of 0000 and 0011. When the reader 41 sees the collision, the reader 41 sets searching 000 firstly until 0000 ID code is found, and then 001 until 0011 ID code is found. As such, applying the binary search algorithm is simple and quick but heavy communication between the reader 41 and the transponder 42 is required, which needs guard time for switch between the reader 41 and the transponder 42 in order to avoid error caused by the switch. However, it wastes time and reduces entire performance.

FIG. 5 is a timing of every transponder using the random number method. As shown in FIG. 5, every transponder generates a random number and a reader sets a response cycle. Next, the random numbers determine corresponding periods for transponders respectively. For example, the response cycle is 4, i.e., transmission every 4 periods, and every transponder has different duration for one period, determined by the random number. Accordingly, transmission time for every transponder is different such that every ID code in response can be read accurately. As shown in FIG. 5, ID code of a transponder C is read first, then ID code of a transponder A is read and final ID code of a transponder B is read. In some random number methods, a random number is compared with a value preset by a reader, and an ID code corresponding to the random number can be transmitted when the random number has the same value as the reader or conversely the ID code cannot be transmitted. However, applying the random number method may cause no response signal during a certain time, and both occurrence point and duration regarding the certain time are unpredictable, thus leading to poor time efficiency. For example, time is wasted at Tc1–Tc4 and Ta2–Ta4 of FIG. 5.

Therefore, it is desirable to provide an improved system and method to mitigate and/or obviate the aforementioned problems.

SUMMARY OF THE INVENTION

An object of the present invention is to provide a radio frequency identification (RFID) communication system and the search method thereof, which can increase time efficiency.

Another object of the present invention is to provide a radio frequency identification (RFID) communication system and the search method thereof, which can reduce unnecessary communication and switch between a read and a plurality of transponders, reduce unnecessary guard time and shorten blank time of transmission.

According to a feature of the present invention, a radio frequency identification (RFID) communication system is provided. The system essentially includes a reader to produce at least one search instruction and to send the search instruction to a communication region; and a plurality of transponders, each, with built-in data, having a first receiver, a first transmitter, a counter, a random number generator and a first controller. When the transponders enter the communication region, in each transponder, the random number generator generates a random number and the counter starts to count the search instruction received by the first receiver to thus obtain a counting value. When in one of the transponders, the counting value meets with the random number, the first controller sends a response request to the reader through the first transmitter, such that the reader after received the response request does not send the search instruction but sends at least one read instruction to read the built-in data.

According to another feature of the present invention, a search method for radio frequency identification (RFID) communication system is provided. The method includes: a search step, which uses a reader to search at least one transponder in a communication region by means of a plurality of search instructions; a transponder start step, which starts the at least one transponder in the communication region in order to generate a random number and receive the search instructions for counting and further obtaining a counting value; a comparison step, which compares the random number and the counting value such that a response request is sent to the reader as the random number meets with the counting value; and a read step, which uses the reader to send at least one read instruction to the communication region such that one transponder corresponding to the response request sends its built-in data to the reader. At this point, remaining transponders do not count until the built-in data of the transponder is sent completely. Next, the remaining transponders repeat the transponder start step, the comparison step and the read step until all built-in data is read by the reader.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
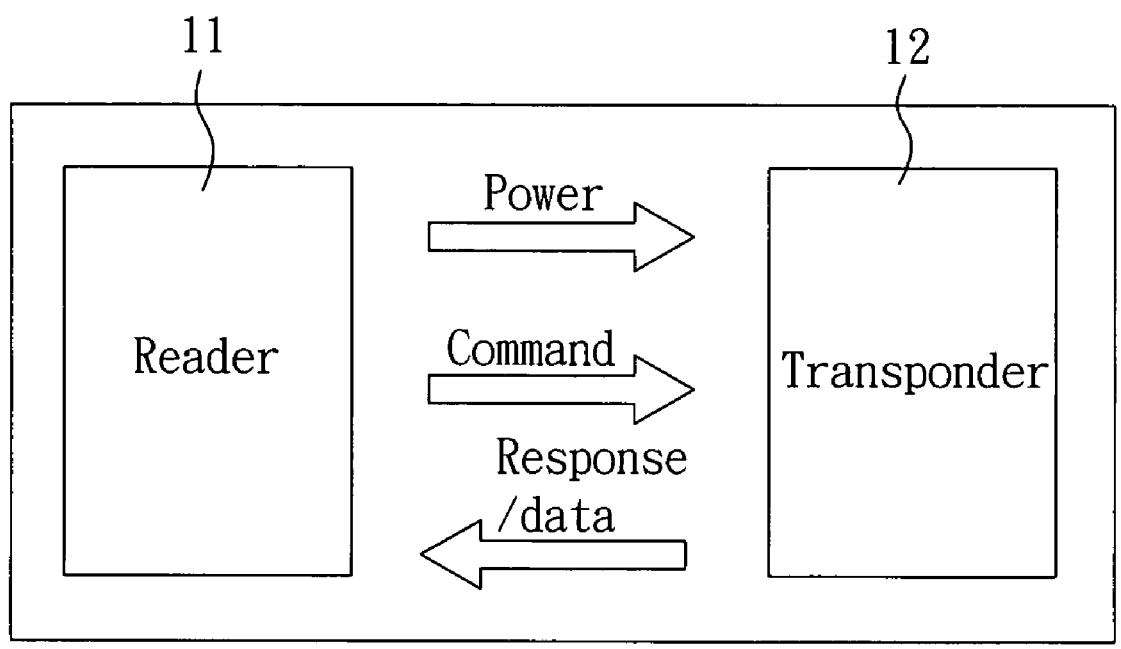
FIG. 1 is a schematic diagram of essential devices of a typical RFID communication system.
Figure 2:
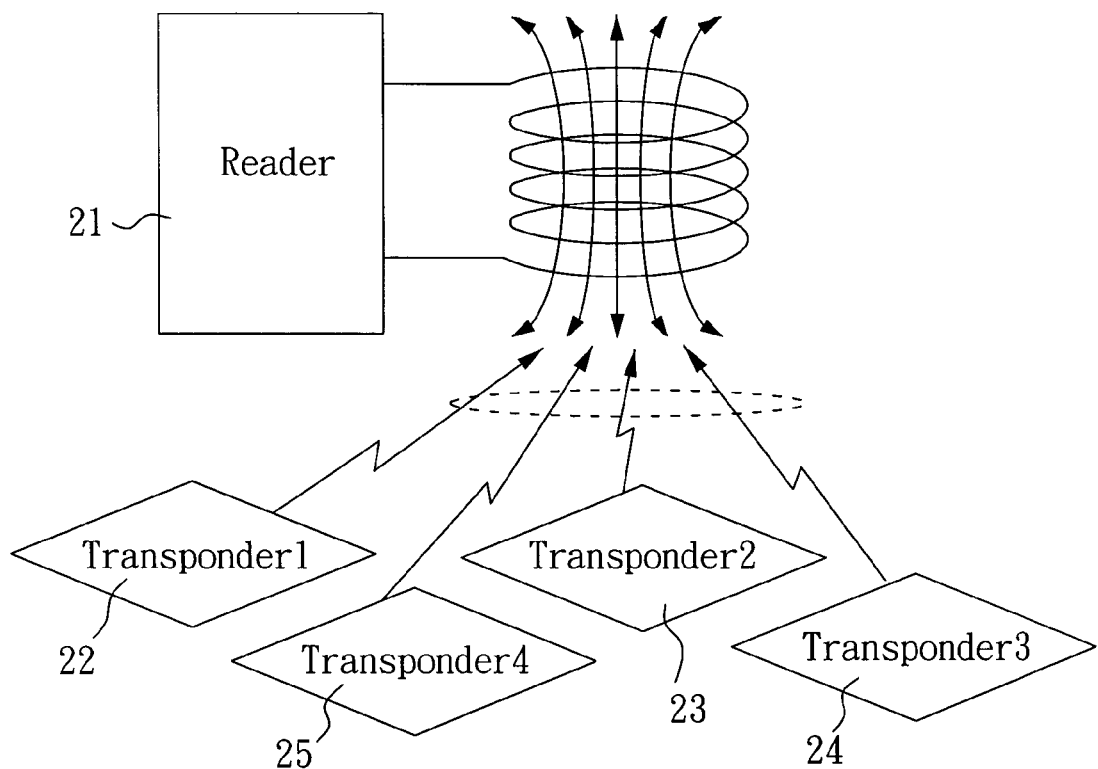
FIG. 2 is a schematic diagram of communication between one reader and a plurality of transponders.
Figure 3:
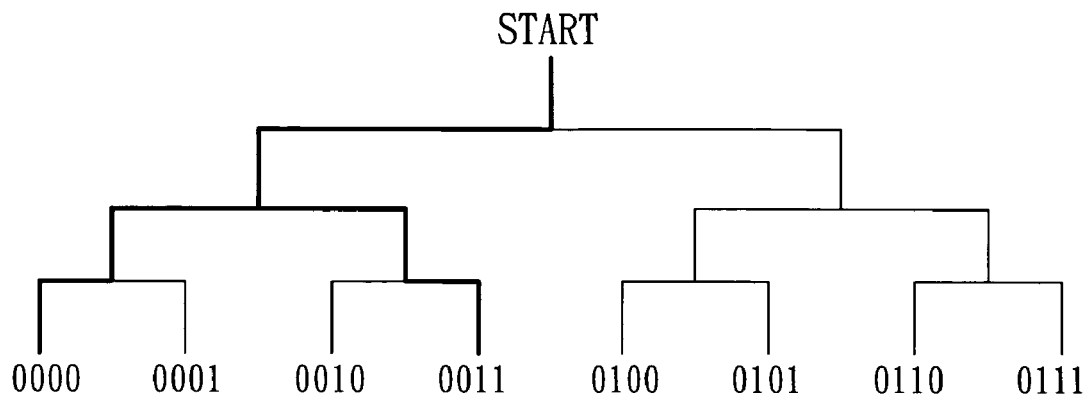
FIG. 3 is a schematic diagram of the binary search algorithm.
Figure 4:
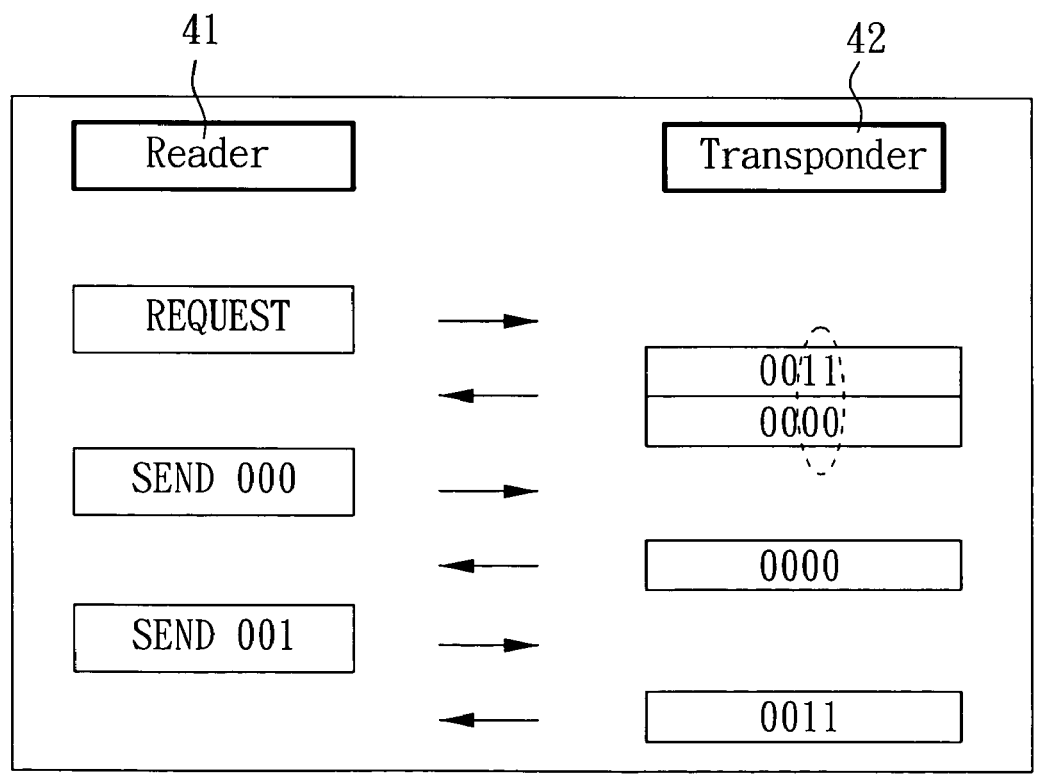
FIG. 4 is a flowchart of communication between a read 41 and a transponder 42.
Figure 5:
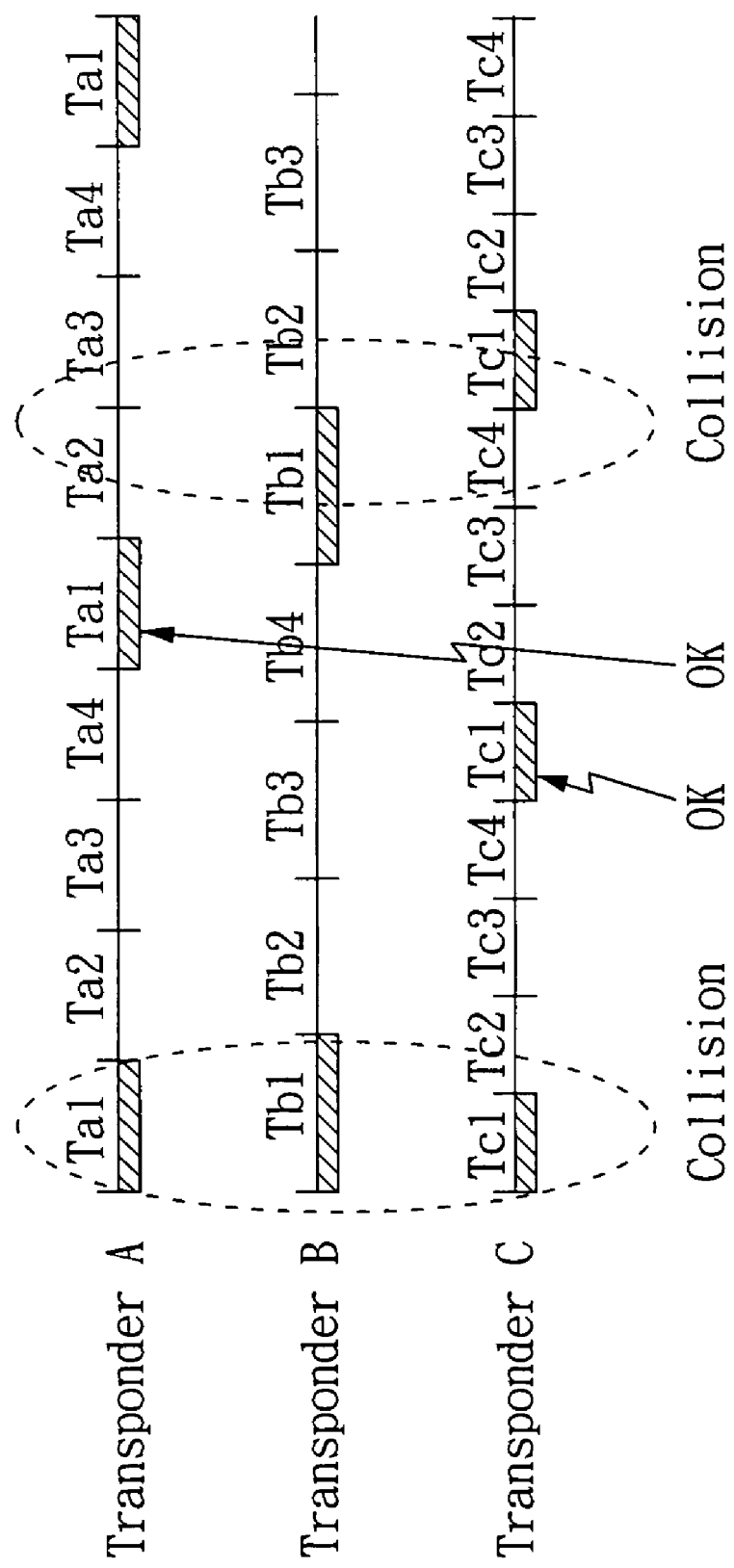
FIG. 5 is a timing of every transponder using the random number method.
Figure 6:
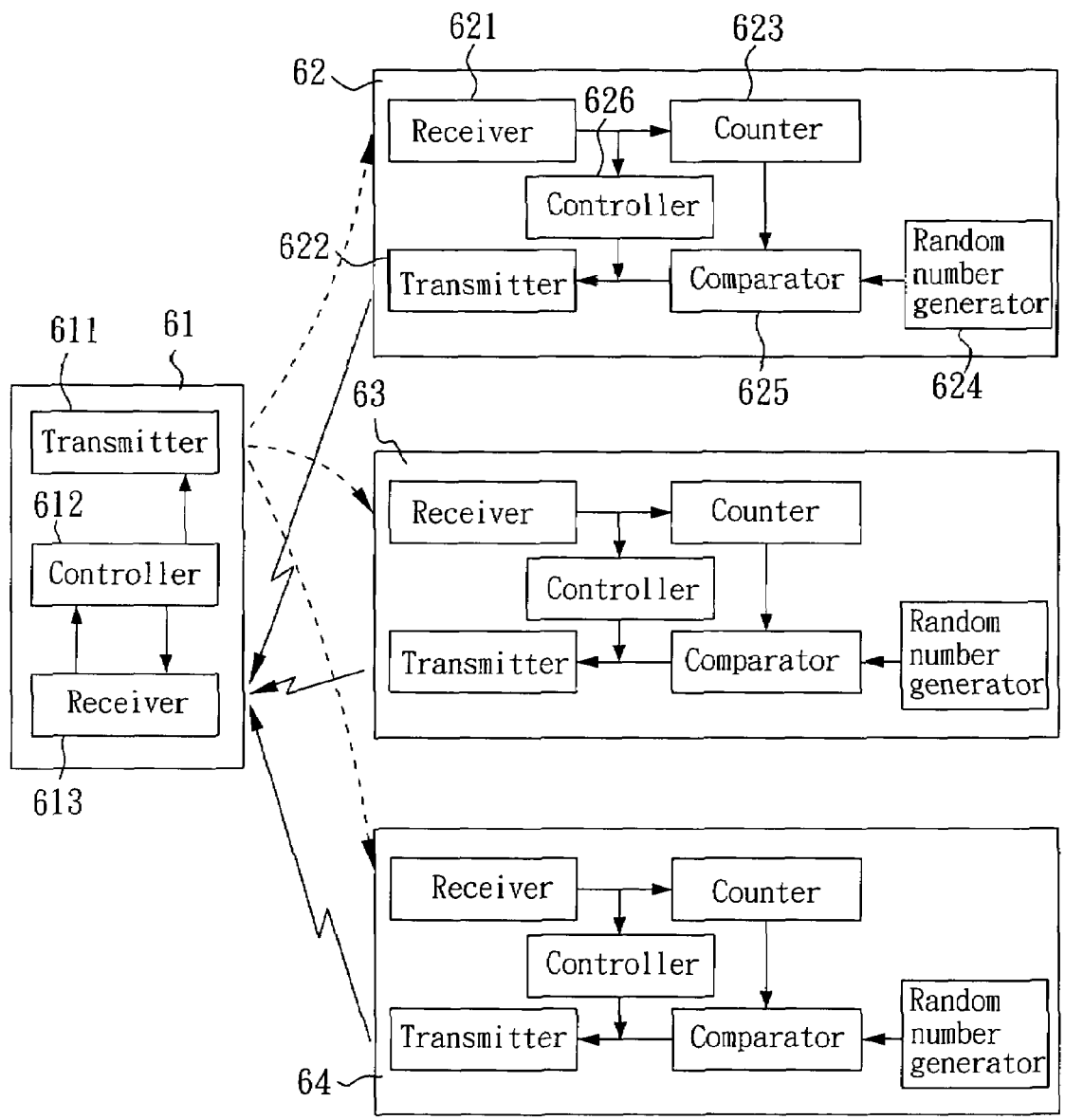
FIG. 6 is a schematic diagram of a system configuration according to an embodiment of the invention.

FIG. 6 is a schematic diagram of a system configuration in accordance with a preferred embodiment of the invention, where an example of personnel access control is given. In FIG. 6, the system consists of a reader 61 and three transponders 62–64. As shown in FIG. 6, the reader 61 has a transmitter 611, a controller 612 and a receiver 613. Each of the transponders 62–64 has a receiver 621, a transmitter 622, a counter 623, a random number generator 624, a comparator 625 and a controller 626.

In this embodiment, the reader 61 is implemented on important entrances and each of the transponders 62–64 represents a personal smart card with built-in data (e.g., employee number and certificate number) in an internal memory or represented by received voltage on an external pin. Therefore, personnel access control is achieved by applying the reader 61 to read built-in data of the transponders 62–64.

The reader 61 can detect a communication region so as to find the transponders 62 in the communication region and read its response data, i.e., the reader 61 transmits a magnetic field such that when the transponder 62 enters the magnetic field, its coil can be induced to produce current to start itself operation. How the reader 61 searches the transponders 62–64 and associated built-in data is described hereinafter.

Figure 7:
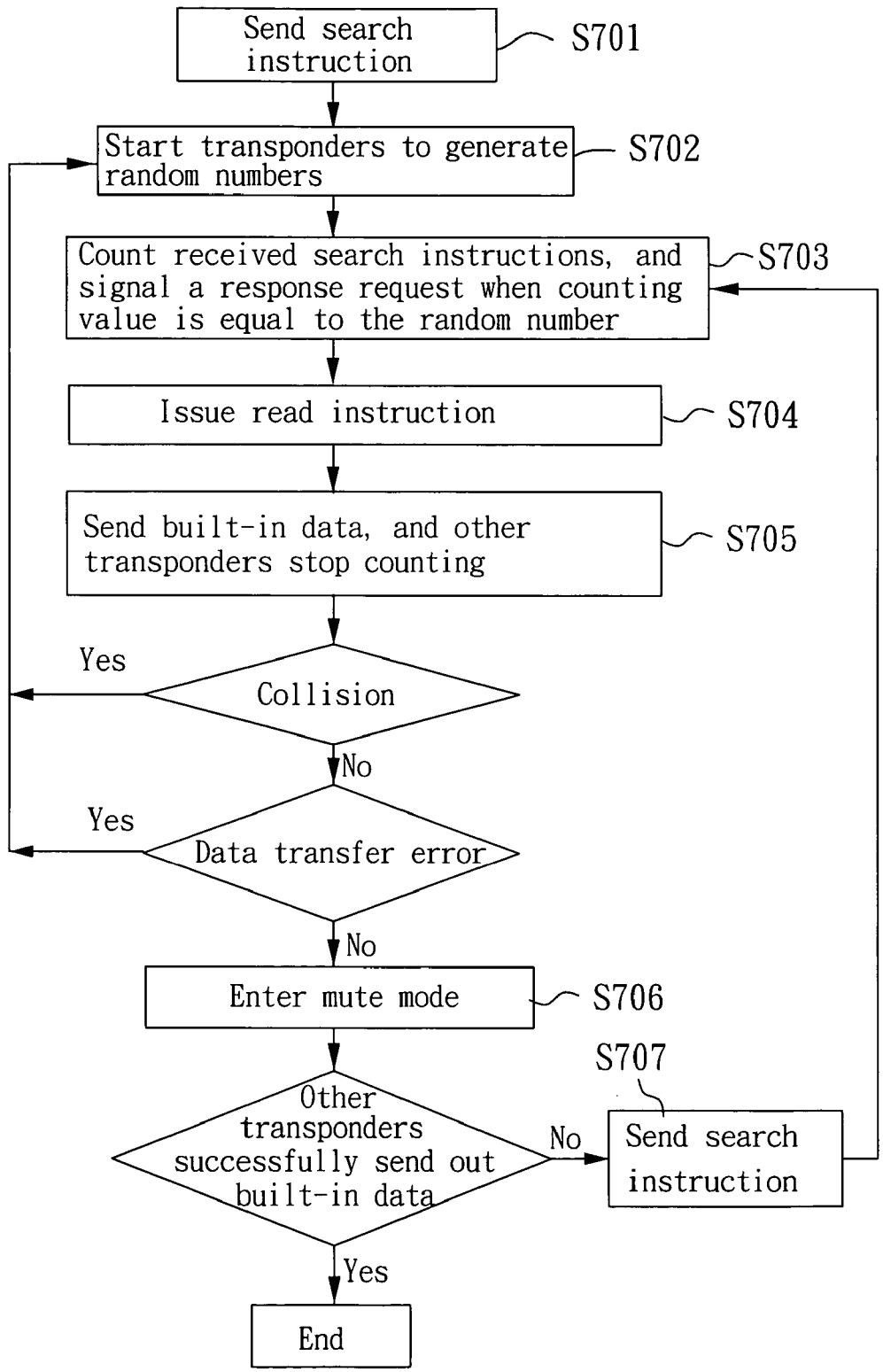
FIG. 7 is a flowchart of FIG. 5 according to an embodiment of the invention.

Next, with reference to FIGS. 6 and 7, there are shown an operation flow of the invention. The controller 612 of the reader 61 continuously sends a plurality of search instructions to the communication region through the transmitter 611. Each of the search instructions represents a time slot, so that time for continuously sending the search instructions by the reader 61 is divided into many time slots (step S701).

When three transponders 62–64 enter the communication region at the same time (e.g., the time to go to work and off duty), each can produce enough current for work via the magnetic field. After starting the current, each internal random number generator 624 generates a random number. For example, the transponder 62 generates a random number 3, the transponder 63 generates a random number 5 and the transponder 64 generates a random number 5, wherein each random number is regarded as respectively sequential number for read (step S702).

Each of the transponders 62–64 starts to receive search instructions through its receiver 622 and to count search instructions received through its counter 623, thereby obtaining a counting value. Next, the comparator 625 determines if the counting value meets with the random number (sequential number for read). When the counting value meets with the random number, the controller 626 generates a response request to the reader 61 through the transmitter 622. For example, when the counter 623 counts to 3, the counting value is found as equal to the random number (sequential number for read) and thus the transponder 62 signals a response request (step 703).

At this point, the receiver 613 receives the response request and accordingly knows having the transponder 62 in the communication region. The controller of the reader 61 issues read instructions of at least one time slot to the communication region (step S704). The transponders 62-64 see (receive) the read instructions issued by the reader 61, whereas only the transponder 62 which issues the response request can respond to the read instructions. Therefore, the controller 626 sends its built-in data to the reader through the transmitter 622. Because the transponders 63 and 64 do not issue any response request, the read instructions are not available to the transponders 63 and 64. Thus, the transponders 63 and 64 do not send their built-in data to the reader 61. At this point, since no search instruction is received, the counting for the search instruction is paused to stop the counting value at 3 (step S705).

Duration of sending the built-in data by the transponder 62 is based on time slots used in the read instructions issued by the reader 61. For example, the reader 61 issues the read instructions with 4 time slots and accordingly the transponder 62 sends its built-in data with 4 time slots. When the reader 61 sends the read instructions and starts to receive the built-in data from the transponder 62, it also detects if collision occurs. If no collision occurs, the reader 61 performs data error detection after the built-in data is received completely. In this embodiment, the data error detection adopts CRC detection. Namely, the reader 61 sends a certain preset number of read instructions to the transponder 62. The transponder 62 counts read instructions received. When the number of read instructions counted meets with the certain preset number of read instructions, it represents CRC operation is accurate, i.e., transfer success. Next, the transponder 62 enters a mute mode (step S706) such that the reader 61 can focus on reading unsuccessful built-in data from the transponders 63 and 64.

Figure 8:
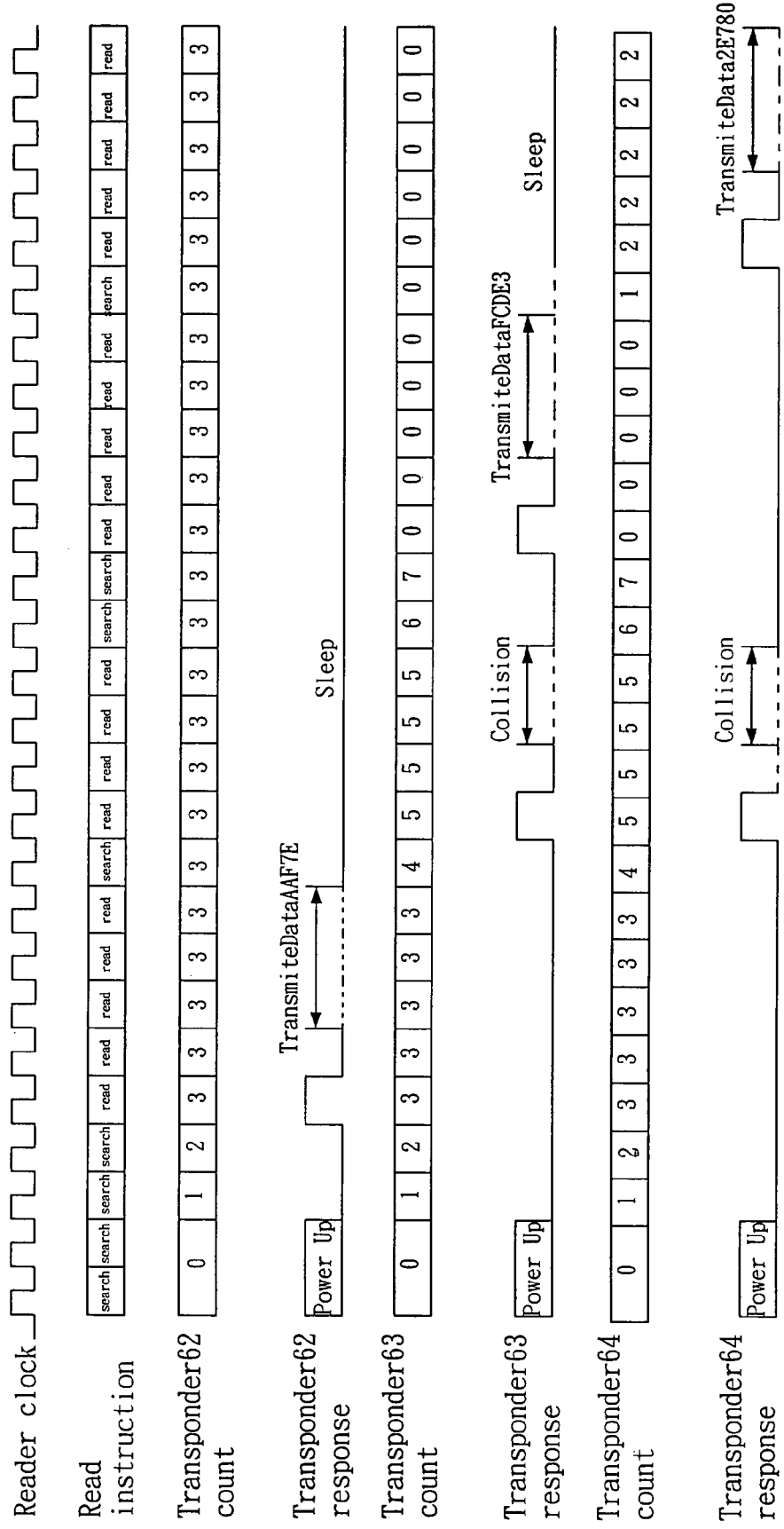
FIG. 8 is a timing of FIG. 5 according to an embodiment of the invention.

Accordingly, the reader 61 sends at least one search instruction again to the communication region (step S707) to start counting action at the transponders 63 and 64. The counting action starts with the previous value paused, i.e., the value of 3. When the transponders 63 and 64 reach to a counting value of 5, the transponders 63 and 64 concurrently send a response request to the reader 61 because the counting value of 5 meets with their random numbers, such that the reader 61 sends read instructions for sending built-in data to the reader 61 from the transponders 63 and 64, which causes a collision. When the reader 61 detects data transfer error (CRC operation error) or a collision occurs, the reader 61 does not send read instructions and its controller 612 sends search instruction again to interrupt data transmission. At this point, the transponders 63 and 64 see the collision or the data transfer error because they do not completely send the built-in data but receive the search instruction again. Therefore, the transponders 63 and 64 stop the data transfer and generate a new random number each. For example, the transponder 63 generates a new random number 0 while the transponder 64 generates a new random number 2. After counters in the transponders 63 and 64 is reset to zero for counting. Following steps for sending built-in data of the transponders 63 and 64 are operated as same as steps S703–S706. Thus, built-in data is read completely from the transponders 62–64 to the reader 61, as shown in FIG. 8, which shows communication between the reader 61 and the transponders 62–64.

When the reader 61 finds serious collision, the controller 612 generates random length instructions to the communication region, thereby increasing random number range generated by the transponders 62–64 and reducing collision probability. If the transponders 62–64 have no response (blank time) for a long time, the reader 61 sends random length instruction again, thereby reducing random number range generated by the transponders 62–64 and thus shortening the blank time.

In view of the foregoing, it is known that the invention essentially uses two types of instructions between a reader and multiple transponders. Namely, search instruction and read instruction are used to complete entire read process such that a transponder does not require sending additional information except response request and built-in data. Accordingly, entire communication process is simple and has no guard time. The reader can adjust random number length generated by internal random number generator of each transponder and reduce blank time based on collision situation, thereby increasing read time efficiency.

Although the present invention has been explained in relation to its preferred embodiment, it is to be understood that many other possible modifications and variations can be made without departing from the spirit and scope of the invention as hereinafter claimed.

What is claimed is:

1. A radio frequency identification (RFID) communication system, comprising:
   a reader, to produce at least one search instruction and to send the search instruction to a communication region; and
   a plurality of transponders, each, with built-in data, having a first receiver, a first transmitter, a counter, a random number generator and a first controller,
   wherein when the transponders enter the communication region, in each transponder, the random number generator generates a random number and the counter starts to count search instruction received by the first receiver to thus obtain a counting value; and when in one of the transponders, the counting value meets with the random number, the first controller sends a response request to the reader through the first transmitter, such that the reader after receiving the response request does not send the search instruction but sends at least one read instruction to read the built-in data.

2. The RFID communication system as claimed in claim 1, wherein each transponder has a comparator to compare the counting value and the random random.

3. The RFID communication system as claimed in claim 1, wherein the reader has a second receiver, a second controller generating the search instructions and the at least one read instruction, and a second transmitter sending the search instructions and the at least one read instruction to the communication region.

4. The RFID communication system as claimed in claim 1, wherein the transponders start power via magnetic field, thereby starting the first receiver, the first transmitter, the counter, random number generator and the first controller each.

5. The RFID communication system as claimed in claim 1, wherein the one of the transponders receives the at least one read instruction and sends the built-in data through the first transmitter to the reader according to a number of the at least read instruction.

6. The RFID communication system as claimed in claim 5, wherein the first transmitter performs error detection after the built-in data is sent and next enters a mute mode.

7. The RFID communication system as claimed in claim 1, wherein after the reader sends the read instructions, remaining transponders which do not send the response request pauses counting performed by their counters until the reader sends a plurality of search instructions again.

8. The RFID communication system as claimed in claim 1, wherein when at least two transponders send corresponding response requests to the reader and thus occur a collision, the reader does not send the at least one read instruction but sends a plurality of search instructions and the at least two transponders generate a new random number and reset counter for next searching, respectively.

9. The RFID communication system as claimed in claim 1, wherein the reader further generates a random length instruction to control bit number for random numbers generated by random number generators of the transponders.

10. A search method for RFID communication system, comprising the steps of:
    a search step, which uses a reader to search at least one transponder in a communication region by means of a plurality of search instructions;
    a transponder start step, which starts the at least one transponder in the communication region in order to generate a random number and receive the search instructions for counting and further obtaining a counting value;

a comparison step, which compares the random number with the counting value such that a response request is sent to the reader as the random number meets with the counting value; and a read step, which uses the reader to send at least one read instruction to the communication region such that one transponder corresponding to the response request sends its built-in data to the reader, remaining transponders do not count until the built-in data of the transponder is sent completely, and the remaining transponders repeat the transponder start step, the comparison step and the read step until all built-in data is read by the reader.

11. The search method as claimed in claim 10, wherein in the read step, the one transponder sending the response request receives the at least one read instruction sent by the reader, sends its built-in data to the reader according to the at least read instruction first transmitter, performs error detection after its built-in data is sent completely and enters a mute mode.

12. The search method as claimed in claim 10, wherein in the read step, after the one transponder's built-in data is sent completely, the reader sends a plurality of search instructions again and the remaining transponders retrieve counting to thus repeat the comparison step and the read step.

13. The search method as claimed in claim 10, wherein when occurring a collision or detection error, the at least one transponder performs the transponder start step in order to generate a new random number and performs the comparison step and the read step based on the new random number.

14. The search method as claimed in claim 10, wherein when a collision frequency exceeds a threshold, the reader issues at least one random length instruction to the at least one transponder, thereby changing a length of the at least one transponder's random number.

* * * * *